United States Patent [19]

Rumsey et al.

[11] Patent Number: 4,850,263

[45] Date of Patent: Jul. 25, 1989

[54] SPRING BRAKE CONSTRUCTION AND METHOD OF MANUFACTURE THEREOF

[75] Inventors: Donald Rumsey, Boise, Id.; John McGraw, Laguna Beach, Calif.

[73] Assignee: Overland Brakes, Inc., Boise, Id.

[21] Appl. No.: 141,536

[22] Filed: Jan. 7, 1988

[51] Int. Cl.⁴ .............................................. F01B 7/00
[52] U.S. Cl. ......................................... 92/63; 92/62; 92/48; 92/50; 92/98 R; 92/130 A
[58] Field of Search .................... 92/93, 94, 96, 98 R, 92/100, 101, 48, 50, 63, 64, 130 A, 128, 130 R, 130 B, 130 C, 130 D, 99; 91/376

[56] References Cited

U.S. PATENT DOCUMENTS

| | | | |
|---|---|---|---|
| 3,478,519 | 11/1969 | Eggstein | 92/48 |
| 3,548,720 | 12/1970 | Swander, Jr. et al. | 92/64 |
| 4,303,006 | 12/1981 | Burke et al. | 92/98 D |
| 4,565,120 | 1/1986 | Gray et al. | 92/63 |

FOREIGN PATENT DOCUMENTS

| | | | |
|---|---|---|---|
| 2431131 | 1/1975 | Fed. Rep. of Germany | 92/63 |
| 1148603 | 4/1969 | United Kingdom | 92/64 |
| 2077376 | 12/1981 | United Kingdom | 92/98 R |
| 2088525 | 6/1982 | United Kingdom | 92/99 |

*Primary Examiner*—Robert E. Garrett
*Assistant Examiner*—Thomas Denion
*Attorney, Agent, or Firm*—Charles H. Thomas

[57] ABSTRACT

An improved spring brake construction is formed by a pair of concave metal housng portions having peripheral lips. Once the internal components of the spring brake are assembled within the housing portions, the lip of one housing portion is spun over the lip of the other housing portion to capture and grip it, thereby permanently sealing the housing portions together. The push rod and coil spring within the spring brake are maintained in axial alignment by a central indentation in one of the housing portions that extends coaxially within the coil spring, and by the construction of the spring diaphragm with a central axial protrusion which extends into a central opening in a spring plate on the side of the diaphragm facing the coil spring. On the opposite side of the diaphragm a push rod seat is laterally restrained from movement relative to the diaphragm.

4 Claims, 2 Drawing Sheets

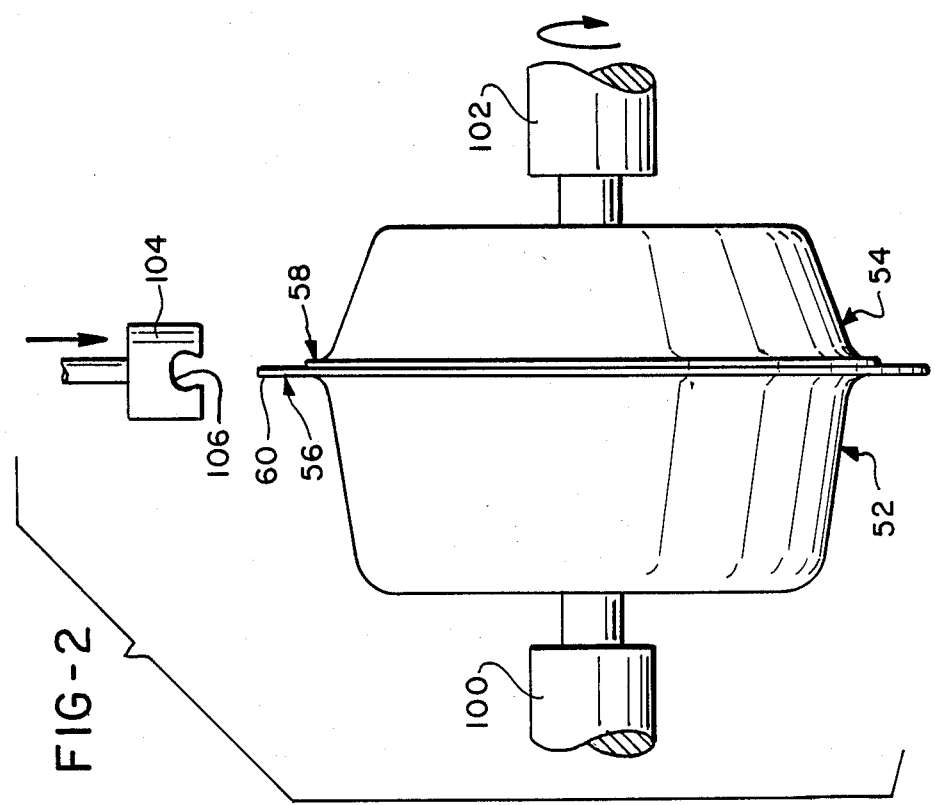

SPRING BRAKE CONSTRUCTION AND METHOD OF MANUFACTURE THEREOF

BACKGROUND OF THE INVENTION

1. Field of the Invention

The present invention relates to an improvement for a pneumatically controlled spring brake of the type utilized in commercial trucks and trailers.

2. Description of the Prior Art

Pneumatic spring brakes are widely utilized in the trucking industry. A typical conventional pneumatic spring brake has both a service brake portion for slowing and stopping a truck or trailer moving under normal conditions by means of a foot valve, and also an emergency parking brake portion. One such brake is manufactured for commercial use as the Anchorlok model 3030L combination service/spring brake by Lear Siegler, Inc., Truck Products Division located in Compton, Calif. The service brake portion of this device applies the brakes of the wheels of a truck or trailer on the highway using pneumatic pressure to act against the service brake diaphragm. Air under pressure is utilized to activate the service braking action.

In a typical pneumatic brake of this type, air is maintained in a pneumatic reservoir at a pressure on the order of one hundred pounds per square inch to provide three thousand pounds of thrust against the thirty square inch effective surface area of the service brake diaphragm. Pneumatic pressure is maintained by an onboard air compressor. However, if a failure develops in the pneumatic air supply system, the service brake will not function. Therefore, an emergency brake is also provided.

In a double diaphragm spring brake the emergency or parking brake is mounted directly behind the service brake. The actuation force applied from the emergency or parking brake is applied to the brake mechanism on the vehicle wheel through the service brake. Application of the emergency brake is entirely mechanical. The actuating force by the emergency or parking brake is applied by a heavy coil spring in a spring chamber. This spring is maintained in check by air pressure acting on the opposite side of a diaphragm in the brake housing. The heavy spring within the spring brake portion of the device applies the brake on a wheel to which it is connected when there is a loss of air pressure in the spring chamber of the emergency and parking brake. Such a loss of air pressure can occur either through a break or failure in the air line applying pressure in the spring brake chamber, or by intentional exhaustion of air from the parking brake chamber, as when the truck or trailer is parked.

When pneumatic pressure is available for the spring brake, as during normal operation of the vehicle, the pneumatic pressure acts against the spring brake diaphragm to compress a heavy coil spring within the spring brake housing. This prevents the coil spring from acting against a push rod to apply the brake to the vehicle wheel. However, a pressure failure in the pneumatic line will remove the counter-balancing pneumatic force from the spring brake diaphragm and allow the heavy, compressed coil spring to act upon the push rod to apply the brake and prevent the wheel associated therewith from turning. Accordingly, the spring brake is activated both during a failure of pneumatic pressure, in which case the spring brake serves as an emergency brake, and also when the vehicle is parked, in which case the spring brake serves as a parking brake.

When compressed within the separable brake housing portions which are typically joined together by semi-circular clamping rings, the spring contains a tremendous amount of potential energy. The coil spring is quite heavy and typically weighs three pounds or more. The spring is compressed to a linear length of less than three inches from an original uncompressed length in an extended condition of from nine to twelve inches. Consequently, the compressed spring in the pneumatic spring brake housing can be extremely dangerous, especially to persons who are unaware of the danger or are unfamiliar with the structure and manner of interaction of the component parts of the spring brake. The spring is held in a compressed condition so as to exert a force on the housing of from two thousand to three thousand pounds. If an unskilled person attempts to take the spring brake apart for repair, the spring will literally explode from the housing and cause profound bodily injury, and even death.

One approach toward reducing the potential for injury when a spring brake is disassembled is to "cage" the spring prior to disassembly so that the spring exerts no pressure against the spring brake diaphragm. Caging is performed by inserting a special bolt through an access hole in the end of the spring housing, concentrically through the coils of the spring, and into a pressure plate. The bolt is equipped with a transverse cross pin at the end which is inserted through the pressure plate. The pressure plate includes a slot to admit the cross pin therethrough. Once the cross pin clears the pressure plate the bolt is turned so that the cross pin is brought into contact with a recess in the underside of the pressure plate. A nut is then threadably engaged on the threaded end of the bolt which protrudes from the access hole. The nut is tightened down against the housing adjacent to the access hole. Tightening of the nut at the exposed end of the bolt draws the pressure plate toward the end of the housing in which the access hole is formed, thereby retracting the spring pressure plate and the coiled spring away from the diaphragm.

Caging of the spring can be quite dangerous however if the pressure plate has corroded or the spring has broken. Furthermore, it is not uncommon for springs to break, due to fatigue, especially when a plug has fallen from the access hole and corrosion has accelerated fatigue. Consequently, the disassembly of a spring brake still entails considerable risk of bodily injury and damage.

In conventional spring brakes, the clamping ring which joins separable housing portions of the spring brake is constructed of two generally semi-circular clamping ring elements having radially outwardly turned attachment ears which are bolted together. Each of the housing portions is formed with a radially outwardly directed lip or rim. These outwardly directed lips or rims are pressed toward each other throughout their perimeters. When nuts are tightened on the bolts the distance of separation between the juxtaposed attachment ears is reduced as the bolt assemblies draw the clamp ring elements toward each other to firmly grip and secure the separable housing portions of the brake together. The lips or rims of two adjacent housing portions are entrapped and held together by a clamping ring. The clamping ring encircles the housing portions at their mutual interface. However, any person with the most rudimentary of workshop tools can unthread the nuts from the bolts and thereby inadvertently release the tremendous power of the coil spring.

SUMMARY OF THE INVENTION

A primary object of the present invention is to provide a pneumatic spring brake which has a housing that is permanently sealed. The spring brake housing constructed according to the invention is formed of a pair of concave shell-like housing portions which have annular lips at their openings which fit together. The lip of one of the housing portions may be considered to be an inner lip, and the lip of the other portion may be considered to be an outer lip. Once all of the components of the spring brake have been installed within the housing portions, the outer lip is wrapped over and captures the inner lip such that the extremity of the outer lip is directed radially inwardly at a diameter smaller than the diameter of the outward extent of the inner lip. By locking the housing portions together in this manner the risk of bodily injury which might otherwise result from tampering is greatly alleviated.

In one broad aspect the invention may be considered to be an improvement to a pneumatic spring brake for an automotive vehicle having a housing formed of mating, concave shells which both have annular mating lips at their outer peripheries. According to the improvement of the invention, the lip of one of the shells is the inner lip and the lip of the other of the shells is an outer lip. The outer lip is wrapped over and captures the inner lip such that the extremity of the outer lip is directed radially inwardly.

In another aspect the invention may be considered to be an improvement in a pneumatically controlled spring brake for an automotive vehicle having a housing defining a cavity therewithin with a diaphragm disposed within the cavity to divide the cavity into first and second chambers. A coil spring is disposed within the first chamber and a push rod is disposed within the second chamber in coaxial alignment with the coil spring and projects from the housing. According to the improvement of the invention, the housing is formed of a pair of concave shells which meet together in surrounding annular lips. The lip of one of the shells is an outer lip having radially inwardly and radially outwardly directed lip portions. The lip of the other shell is an inner lip and the radially inwardly directed portion of the outer lip is turned over the inner lip of the other shell to capture the inner lip of the other shell between the radially inwardly directed and the radially outwardly directed portions of the outer lip.

Preferred embodiments of the structure of the invention have still other features of considerable advantage. Specifically, because the housing of the pneumatic spring brake is permanently sealed, it is particularly important to ensure that the compressed coil spring and the push rod remain in precise axial alignment within the housing. In conventional spring brake structures, the coil spring can sometimes shift at the end where it bears against the structure of the housing. When this occurs the spring exerts an oblique force on the push rod, so that the push rod moves through its bearing at a slight angle relative to exact axial alignment. When this occurs there is a considerable wear on the bearing. With excessive wear the bearing will lose its ability to retain pressure, thus terminating the useful life of the spring brake structure.

In conventional spring brakes the push rod bears against the center of the spring diaphragm in a chamber opposite the chamber containing the coiled spring. Sometimes the spring plate carrying the spring is assembled out of alignment with the push rod. Also the diaphragm may be installed incorrectly which can cause an improper alignment. Either of these conditions will result in force being applied on the push rod at an angle relative to its proper axial alignment. Again, operation of the spring brake with a misaligned spring or diaphragm will lead to excessive wear on the bearing and a loss of useful function. The spring plate which is interposed between the spring and diaphragm, has a conical projection on the spring side which mates with a conical depression on the spring housing that serves to align the spring when it is compressed.

To prevent misalignment of the spring brake push rod, the structure of the spring brake of the invention differs from a conventional spring brake in several very significant respects. Specifically, a central indentation is preferably defined in the housing shell against which the coil spring bears. The indentation is in the form of a disk-shaped depression in the outer surface of the housing shell, which forms a corresponding disk-shaped projection into the housing chamber containing the coil spring. The projection is centered coaxially within the coil spring and in axial alignment with the push rod. The inwardly extending projection into the spring chamber is preferably of a diameter equal to the interior diameter circumscribed by the coil spring where it bears against the housing. The disk-shaped projection therefore serves as a centering guide to laterally stabilize the end of the coil spring that bears against the housing and prevents that end of the spring from shifting laterally across the surface of the spring housing. The end of the coil spring bearing directly against the housing is thereby held in precise coaxial alignment with the push rod.

Preferably also, the spring brake diaphragm which divides the spring brake housing cavity into separate chambers for the coil spring and the push rod is provided with means facing the coil spring for laterally stabilizing the other end of the coil spring. The diaphragm is preferably also provided with means facing the push rod to center the diaphragm.

The spring chamber is preferably provided with an annular spring plate that is interposed between the coil spring and the diaphragm and which has an axial opening therethrough. The diaphragm is preferably formed with a central axial protrusion which extends into the axial opening of the spring plate. This central protrusion into the coil spring chamber may be provided by permanently deforming the center of the diaphragm so that it includes a central, axial disk-shaped truncated centering post which extends into and fits within the axial opening of the spring plate. The longitudinally extending portion of the diaphragm thereby forms a laterally stabilizing guide at the other, interior end of the coil spring which prevents the spring plate from moving out of axial alignment with the push rod. As a consequence, both ends of the coil spring are held in precise axial alignment with the push rod.

By permanently deforming the diaphragm to provide a longitudinal protrusion into the coil spring chamber, a central axial depression is created in the opposite side of the diaphragm which faces the push rod. Preferably, a push rod seat is interposed between the diaphragm and the push rod and projects into the depression of the diaphragm. The push rod seat also forms a central, axial socket to receive the end of the push rod which bears against the diaphragm. The axial depression in the diaphragm thereby maintains the push rod seat laterally centered relative to the diaphragm.

All of the foregoing preferred features aid in maintaining the spring and diaphragm in precise axial alignment within the pneumatic sealed spring brake housing. This reduces wear on the bearing which provides a pneumatic pressure seal about the push rod so as to allow the chamber of the housing cavity opposite the chamber occupied by the coil spring to be pressurized.

In yet another broad aspect the invention may be considered to be an improved method of manufacturing a pneumatically operated spring brake for an automotive vehicle having a housing formed of first and second concave metal housing portions both having peripheral annular mating lips and within which operating components are mounted. The improvement of the invention is comprised of the steps of permanently sealing the housing lips together by positioning the mating lips in juxtaposition such that the lip of the first housing portion extends radially outwardly beyond the lip of the second housing portion, by pressing the lips of the housing portions longitudinally toward each other, by turning the lip of the first housing portion over the lip of the second housing portion throughout their circumferences, and by forcing the peripheral margin of the lip f the first housing portion inwardly to capture and grip the lip of the second housing portion.

According to the method of the invention the lip of the first housing portion is preferably spun over the lip of the second housing portion. That is, the metal housing portions are rotated together with the lips adjacent to each other throughout their peripheries. Pressure is applied radially inwardly against the radially outermost portion of the lip of the first housing portion to turn that lip over to capture and grip the lip of the second housing portion.

The invention may be described with greater clarity and particularity by reference to the accompanying drawings.

DESCRIPTION OF THE DRAWINGS

FIG. 2 shows a series of elevational views diagrammatically depicting the improved method of fabrication of the spring brake of FIG. 1.

DESCRIPTION OF THE EMBODIMENT AND IMPLEMENTATION OF THE METHOD

Figure 1:
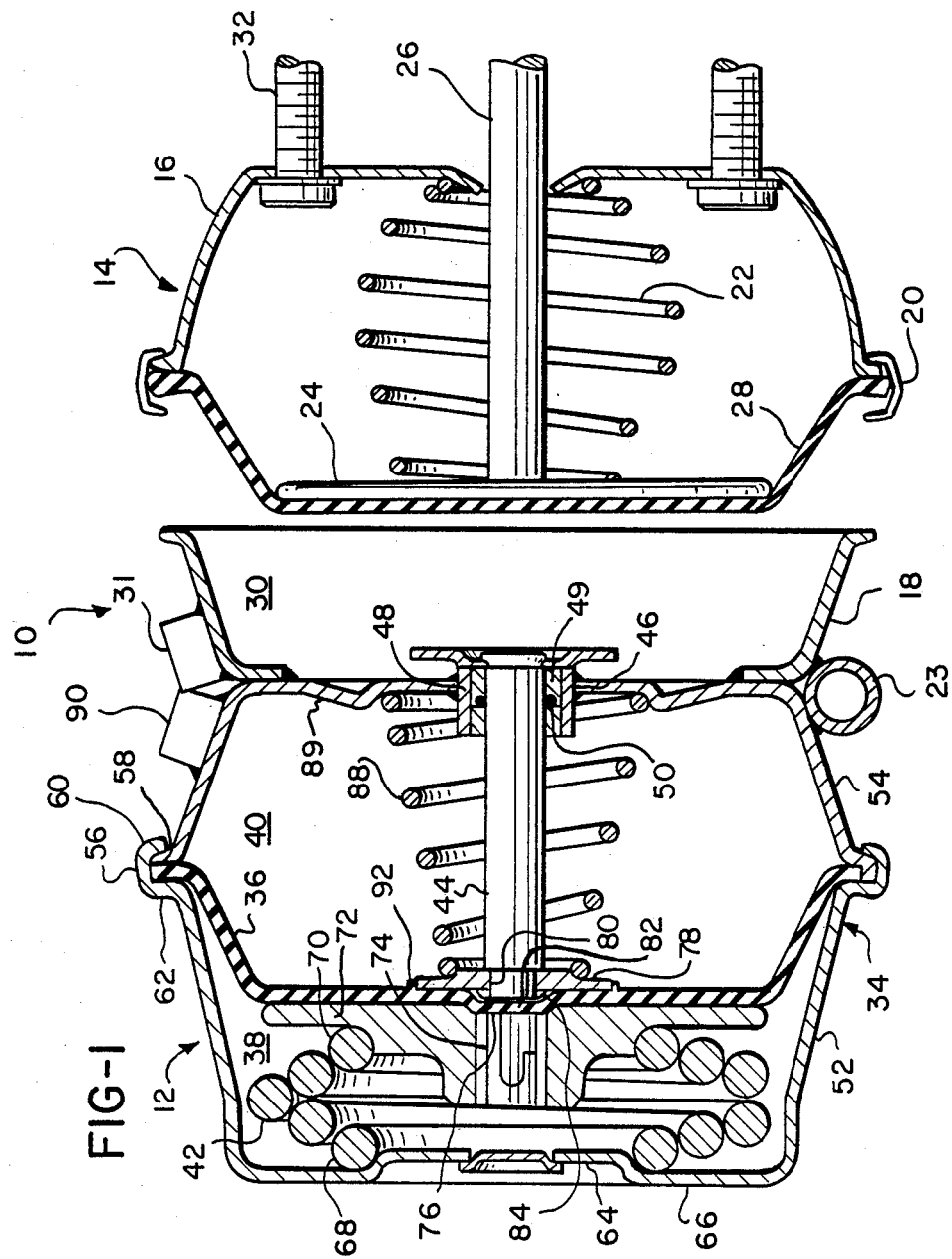
FIG. 1 is a sectional elevational view of a dual diaphragm spring brake constructed according to the invention. The service brake and spring brake are shown prior to assembly for simplicity.

FIG. 1 illustrates a pneumatically controlled dual diaphragm spring brake 10 adapted for use with an automotive vehicle, such as a truck tractor or trailer. The spring brake assembly 10 includes both a spring brake portion 12 and a service brake portion 14. The service brake portion 14 of the spring brake assembly 10 is of a conventional construction and includes a pair of concave, shell-like housing portions 16 and 18 having radial lips held together by a conventional encircling clamping ring 20. A service brake spring 22 acts against a bearing plate 24 to force a service brake push rod 26 to the left, as viewed in FIG. 1. The bearing plate 24 acts against the service brake diaphragm 28. When pneumatic pressure is applied to the pressure chamber 30 to the left of the service brake diaphragm 28, the push rod 26 will be forced to the right, thereby applying the vehicle brake. The service brake housing portion 16 is fastened to the wheel drum by bolts 32.

The spring brake 12, on the other hand, is an improved structure constructed according to the present invention. The spring brake 12 is formed of a housing 34 which defines a cavity therewithin. A spring brake diaphragm 36 is disposed within the cavity to divide the cavity into a first chamber 38 and a second chamber 40. A heavy coil spring 42 is disposed within the first chamber 38. A spring brake push rod 44 extends into and is disposed within the second chamber 40 in coaxial alignment with the coil spring 42. As illustrated, the spring brake push rod 44 projects to the left from the service brake housing through an axial opening 46 into the second spring brake chamber 40 and through an annular bearing 49. The bearing 49 may be constructed of relatively soft metal, such as bronze, and includes an annular recess in its interior wall in which an O-ring seal 50 is seated.

The spring brake housing 34 is formed of a pair of concave housing portions configured as bowl-shaped shells 52 and 54. The shells 52 and 54 are disposed with their open mouths in mutual juxtaposition. The open mouth of the first shell 52 terminates in an annular, outer lip 56, while the mouth of the shell 54 terminates in an annular inner lip 58. As illustrated, the lip 56 of the shell 52 has both a radially inwardly directed lip portion 60 and a radially outwardly directed lip portion 62. The radially inwardly directed portion 60 of the outer lip 56 is turned over the inner lip 58 of the shell 54 to capture the inner lip 58 of the shell 54 between the radially inwardly directed lip portion 60 and the radially outwardly directed portion 62 of the outer lip 56. The peripheral edge of the spring brake diaphragm 36 is also clamped between the outer lip 56 and the inner lip 58 between the lip portions 60 and 62 of the outer lip 56.

Since the lip 56 is wrapped over and captures the lip 58, the two shells 52 and 54 are permanently secured together and cannot be separated. As a consequence, the heavy coil spring 42 is permanently encapsulated within the cavity of the spring brake 12 and cannot be released to cause damage or injury by inexperienced tampering. As a consequence, the spring brake 12 is far safer than conventional spring brakes. The exposure to possible product liability on the part of the manufacturer of the spring brake assembly is thereby greatly reduced.

Because the spring brake 12 is a sealed unit, it is particularly important for the internal components to remain in accurate axial alignment, since the shells 52 and 54 cannot be taken apart to repair or replace internal components. Accordingly, the shell 52 is formed with a central, axial annular indentation 64. The indentation 64 is defined in the center of the end wall 66 of the shell 52 to extend axially into the first chamber 38 coaxially within the end 68 of the coil spring 42 which bears directly against the end wall 66 of the shell 52. The axial indentation 64 thereby laterally stabilizes the end coil 68 of the coil spring 42, as it performs the function of a centering post. The end coil 68 therefore cannot shift laterally relative to the end wall 66 of the shell 52, but is instead held in precise axial alignment with the push rod 44.

The opposite end coil 70 of the coil spring 42 bears against an annular spring plate 72 which is formed of metal and which is interposed between the coil spring 42 and the spring brake diaphragm 36. A circular central axial opening 74 is defined in the spring plate 72.

The spring brake diaphragm 36 is of a conventional construction and is formed of layers of rubber which encapsulate fabric mesh therewithin. As a consequence, although the diaphragm 36 is flexible, it can also be permanently deformed. The diaphragm 36 is, in fact, permanently deformed with a central, axial disk-shaped protrusion 76 which extends into the axial opening 74 of the spring plate 72 as illustrated. The central deformation of the diaphragm 36 defines the central axial protrusion 76 on one side of the diaphragm 36 in the first chamber 38 and also forms a central axial depression on the opposite side of the diaphragm 36 facing the second chamber 40. The protrusion 76 into the chamber 38 laterally stabilizes the right-hand end 70 of the coil spring 42 by preventing the spring plate 72 from shifting laterally across the surface of the diaphragm 36. The protrusion 76 acts as a very short centering post for the spring plate 72.

On the opposite side of the diaphragm 36 in the chamber 40 the spring brake 12 is further provided with a generally disk-shaped push rod seat 78. The push rod seat 78 is of a generally circular configuration, but includes a circular central axial portion 80 which projects into the depression 82 of the diaphragm 36 formed on the obverse side thereof from the protrusion 76. The push rod seat 78 also forms an axial socket 84 in the form of an opening having a chamfered surface facing the diaphragm 36. The socket 84 is configured to receive the necked down end of the spring brake push rod 44. The extremity of this end is upset and flattened into the chamfered surface of the push rod seat 78. The push rod 44 is thereby secured to the push rod seat 78 with a connection similar to a riveted connection. A coil return spring 88 serves to bias the push rod seat 78 toward the diaphragm 36.

The diaphragm 36 is also formed with an annular raised ring 92 directed inwardly toward the second chamber 40. The diameter of the ring 92 is such as to snugly receive the peripheral edge of the push rod seat 78 therewithin. The raised ring 92 and the depression formed in the diaphragm 36 and facing the chamber 40 together restrain relative lateral movement between the push rod seat 78 and the diaphragm 36. The connection of the upset extremity of the push rod end and the socket 84 restrain relative lateral movement between the spring brake push rod 44 and the push rod seat 78. The coil return spring 88 and the diaphragm 36 are thereby laterally stabilized so as to remain in perfect axial alignment with the coil spring 42 and relative to the opening 46 in the end wall 89. As a consequence, excessive wear on the O-ring 50 within the bearing 49 is avoided.

The spring brake housing shell 54 and the service brake housing portion 18 are joined together by welding. A tubular tool pocket 23 is welded transversely to both the spring brake housing shell 54 and the housing portion 18 of the service brake 14 at the mutual interface therebetween to hold the brake release tool for the spring brake 10. Even though the spring brake portion 12 is a sealed unit, a release tool is still needed to release the parking brake so that the vehicle can be moved if there is a failure in the pneumatic system of the vehicle.

FIG. 2 illustrates the manner in which the spring brake housing portions 52 and 54 are permanently coupled together as a sealed unit. As illustrated in FIG. 2, the spring brake housing shells 52 and 54 are mounted within a metal lathe having rotatable turning posts 100 and 102. The spring brake housing shells 52 and 54 are positioned with their mating lips 56 and 58 in juxtaposition such that the lip 56 of the shell 52 extends radially outwardly beyond the lip 58. The housing shells 52 and 54 are then permanently joined by spinning the lip 56 of the shell 52 over the lip 58 of the shell 54. This is done by rotating the shells 52 and 54 together while applying pressure radially inwardly on the lip 56 of the shell 52 by means of a roller 104. By moving the roller 104 radially inwardly as indicated by the directional arrow, the lip 56 is permanently deformed and turned over the outwardly directed lip 58 throughout the circumferences of both of the lips 56 and 58. The peripheral margin 60 of the lip 56 is forced inwardly to capture and grip the lip 58 of the shell 54 in the manner depicted in FIG. 1.

Undoubtedly, numerous variations and modifications of the invention will become readily apparent to those familiar with spring brakes and methods of manufacturing spring brakes. Accordingly, the scope of the invention should not be construed as limited to the specific embodiment and implementation illustrated and described, but rather is defined in the claims appended hereto.

I claim:

1. In a pneumatic spring brake for an automotive vehicle having a housing formed of mating, concave shells which both have annular mating lips at their outer peripheries, wherein said shells together define a cavity, and a diaphragm is disposed in said cavity and extends thereacross and is secured at said lips of said shells, and a coil spring is axially disposed in said cavity and is compressed between said diaphragm and a first of said shells, an annular metal spring plate interposed between said coil spring and said diaphragm and formed with a central axial opening therein, and wherein a push rod is disposed in said cavity in axial alignment with said coil spring and on the opposite side of said diaphragm therefrom, the improvement wherein said lip of one of said shells is an inner lip and said lip of the other of said shells is an outer lip, and an outer lip is wrapped over and captures said inner lip such that the extremity of said outer lip is directed radially inwardly, and a first of said shells is formed with an axial indentation into said cavity to laterally stabilize one end of said coil spring, and the center of said diaphragm is permanently deformed to provide a protrusion facing said coil spring and said spring plate and extending into and engaged in said central axial opening in said spring plate and to provide a depression on its side opposite said protrusion, and a push rod seat interposed between said push rod and said diaphragm and having a central portion projecting into said depression in engagement therewith, whereby said protrusion on said diaphragm serves to laterally stabilize said coil spring and said spring plate relative to said diaphragm and said depression opposite said protrusion serves to laterally stabilize said push rod seat and said push rod relative to said diaphragm.

2. A pneumatic spring brake according to claim 1 wherein said push rod seat projects into said depression of said diaphragm and forms a socket to receive one end of said push rod, whereby said axial depression in said diaphragm maintains the diaphragm laterally centered relative to the push rod.

3. In a pneumatically controlled spring brake for an automotive vehicle having a housing defining a cavity therewithin, a diaphragm disposed within said cavity to divide said cavity into first and second chambers, a coil spring disposed within said first chamber, an annular spring plate interposed between said coil spring and said diaphragm and having a central axial opening therein, and a push rod disposed within said second chamber in coaxial alignment with said coil spring and projecting from said housing, the improvement wherein said housing is formed of a pair of concave shells which meet together in surrounding annular lips, and the lip of one of said shells is an outer lip having both radially inwardly and radially outwardly directed lip portions and the lip of said other shell is an inner lip and said radially inwardly directed portion of said outer lip is turned over said inner lip of said other shell to capture said inner lip of said other shell between said radially inwardly directed and said radially outwardly directed portions of said outer lip, and wherein a central indentation is defined in one of said shells to extend axially into said first chamber coaxially within said coil spring to thereby laterally stabilize one end of said coil spring, and wherein the center of said diaphragm is permanently deformed so that it forms a centering post facing said coil spring which extends into and fits within said central axial opening of said spring plate to laterally stabilize said coil spring and said spring plate relative to said diaphragm, and said diaphragm is provided with a central axial depression on its side opposite said centering post, and further comprising a push rod seat interposed between said push rod and said diaphragm and projecting into said central axial depression on said diaphragm, whereby the permanent deformation of said diaphragm restrains relative lateral movement between said push rod, said push rod seat, and said diaphragm and between said spring plate and said diaphragm.

4. A pneumatically controlled spring brake according to claim 3 wherein said centering post is comprised of a central deformation of said diaphragm which defines a central, axial protrusion on one side of said diaphragm and said central, axial depression on said opposite side of said diaphragm.

* * * * *